United States Patent
Qin et al.

(10) Patent No.: US 12,524,683 B2
(45) Date of Patent: Jan. 13, 2026

(54) METHOD FOR PREDICTING REMAINING USEFUL LIFE (RUL) OF AERO-ENGINE BASED ON AUTOMATIC DIFFERENTIAL LEARNING DEEP NEURAL NETWORK (ADLDNN)

(71) Applicant: Chongqing University, Chongqing (CN)

(72) Inventors: Yi Qin, Chongqing (CN); Sheng Xiang, Chongqing (CN); Jun Luo, Chongqing (CN); Huayan Pu, Chongqing (CN); Quan Qian, Chongqing (CN)

(73) Assignee: Chongqing University, Chongqing (CN)

( * ) Notice: Subject to any disclaimer, the term of this patent is extended or adjusted under 35 U.S.C. 154(b) by 678 days.

(21) Appl. No.: 17/972,539

(22) Filed: Oct. 24, 2022

(65) Prior Publication Data

US 2023/0141864 A1    May 11, 2023

(30) Foreign Application Priority Data

Oct. 28, 2021    (CN) .......................... 202111261992.X (51) Int. Cl.
*G06N 5/022* (2023.01)
*G06N 3/0442* (2023.01)
(Continued)

(52) U.S. Cl.
CPC ........... *G06N 5/022* (2013.01); *G06N 3/0442* (2023.01); *G06N 3/045* (2023.01); *G06N 3/0464* (2023.01)

(58) Field of Classification Search
CPC .... G06N 3/0442; G06N 3/045; G06N 3/0464; G06N 5/022
See application file for complete search history.

(56) References Cited

U.S. PATENT DOCUMENTS

2022/0188646 A1 *  6/2022  Ramesh .............. G06F 18/2193

FOREIGN PATENT DOCUMENTS

CN      111723527 A    *  9/2020  ............. G06N 3/045
WO   WO-2021138500 A1  *  7/2021  ......... G05B 23/0283

OTHER PUBLICATIONS

Elsheikh, A. et al., Bidirectional handshaking LSTM for remaining useful life prediction Oct. 2018, Neurocomputing vol. 323, pp. 148-156 (Year: 2018).*

(Continued)

*Primary Examiner* — Matthew Ell
*Assistant Examiner* — Louis Christopher Nye
(74) *Attorney, Agent, or Firm* — Bochner PLLC; Andrew D. Bochner (57) ABSTRACT

The present disclosure provides a method for predicting a remaining useful life (RUL) of an aero-engine, specifically including: acquiring multidimensional degradation parameters of an aero-engine to be predicted to obtain acquired data; segmenting the acquired data by a sliding window (SW) to obtain preprocessed data; constructing a RUL prediction model of the aero-engine including a multibranch convolutional neural network (MBCNN) model, a multicellular bidirectional long short-term memory (MCBLSTM) model, a fully connected (FC) layer FC1, and a regression layer; taking the preprocessed data as input data of the MBCNN model, extracting an output of the MBCNN model, taking the output of the MBCNN model and recursive data as input data of the MCBLSTM model, and extracting an output of the MCBLSTM model; obtaining an output of the FC layer FC1, and inputting the output of the FC layer FC1 to the regression layer to predict a RUL.

3 Claims, 7 Drawing Sheets

(51) Int. Cl.
    *G06N 3/045*     (2023.01)
    *G06N 3/0464*     (2023.01)

(56) References Cited

OTHER PUBLICATIONS

Li, J. et al., A Directed Acyclic Graph Network Combined With CNN and LSTM for Remaining Useful Life Prediction, May 2019, IEEE Access vol. 7, pp. 75464-75475 (Year: 2019).*

Ma, M. et al., Deep-Convolution-Based LSTM Network for Remaining Useful Life Prediction, May 2020, IEEE Transactions on Industrial Informatics vol. 17 Issue 3, pp. 1658-1667 (Year: 2020).*

\* cited by examiner

METHOD FOR PREDICTING REMAINING USEFUL LIFE (RUL) OF AERO-ENGINE BASED ON AUTOMATIC DIFFERENTIAL LEARNING DEEP NEURAL NETWORK (ADLDNN)

CROSS REFERENCE TO RELATED APPLICATION

This patent application claims the benefit and priority of Chinese Patent Application No. 202111261992.X, filed with the China National Intellectual Property Administration on Oct. 28, 2021, the disclosure of which is incorporated by reference herein in its entirety as part of the present application.

TECHNICAL FIELD

The present disclosure relates to the field of remaining useful life (RUL) prediction for aero-engines, and in particular to a method for predicting a RUL of an aero-engine based on an automatic differential learning deep neural network (ADLDNN).

BACKGROUND

Aero-engine, a highly complex and precise thermal machine, is the engine that provides the aircraft with the necessary power for flights. It is more susceptible to faults for the complex internal structure and harsh operating environment. Hence, accurate prediction on a RUL of the aero-engine is of great significance to operation and maintenance of the aero-engine.

With the development of sciences and technologies, the long short-term memory (LSTM) and convolutional neural network (CNN) have been widely applied to predict a RUL of a rotary machine. However, existing neural networks all process data in a uniform mode, cannot mine different levels of feature information in various feature extraction modes, and have a poor prediction accuracy.

SUMMARY

An objective of the present disclosure is to provide a method for predicting a RUL of an aero-engine based on an ADLDNN, which can be used to predict the RUL of the aero-engine.

The objective of the present disclosure is implemented with the following technical solutions. A method for predicting a RUL of an aero-engine based on an ADLDNN includes the following specific steps:

1) data acquisition: acquiring multidimensional degradation parameters of an aero-engine to be predicted, analyzing a stable trend, and selecting a plurality of parameters capable of reflecting degradation performance of the aero-engine to obtain acquired data;
2) data preprocessing: segmenting the acquired data by a sliding window (SW) to obtain preprocessed data;
3) model construction: constructing a RUL prediction model of the aero-engine based on an ADLDNN, the RUL prediction model including a multibranch convolutional neural network (MBCNN) model, a multicellular bidirectional long short-term memory (MCBLSTM) model, a fully connected (FC) layer FC1, and a regression layer;
4) feature extraction: taking the preprocessed data as input data of the MBCNN model, extracting an output of the MBCNN model, taking the output of the MBCNN model and recursive data as input data of the MCBLSTM model, and extracting an output of the MCBLSTM model; and
5) RUL prediction: taking the output of the MCBLSTM model as an input of the FC layer FC1 to obtain an output of the FC layer FC1, and inputting the output of the FC layer FC1 to the regression layer to predict a RUL.

Further, the MBCNN model includes a level division unit, and a spatial feature alienation-extraction unit; and
the MCBLSTM model includes a bidirectional trend-level division unit, and multicellular update units.

Further, the extracting an output of the MBCNN model in step 4) specifically includes:

4-1-1) level division: taking the preprocessed data in step 2) as the input data, inputting input data $x_t$ at time t to the level division unit of the MBCNN model for level division, the level division unit including an FC layer FC2 composed of five neurons, and performing softmax normalization on an output $D_t$ of the FC layer FC2 to obtain a level division result $D_{1t}$:

$$D_t = \tanh(w_{xd_1} x_t + b_{d_1}) \tag{1}$$

$$D_{1t} = \text{soft max}(D_t) = [d_{11t}, d_{12t}, d_{13t}, d_{14t}, d_{15t}] \tag{2}$$

where in equations (1) and (2), $w_{xd_1}$ and $b_{d_1}$ respectively represent a weight and a bias of the FC layer FC2, $d_{11t}$, $d_{12t}$, $d_{13t}$, $d_{14t}$ and $d_{15t}$ respectively represent an important level, a relatively important level, a general level, a relatively minor level and a minor level, and a position of a maximal element in $D_{1t}$ represents a level division result of a present input; and 4-1-2) feature extraction: inputting, according to a level division result $D_1$ of the input data, the input data to different convolution paths of the spatial feature alienation-extraction unit for convolution, and performing automatic differential processing on an input measured value according to the level division result and five designed convolution paths to obtain a health feature $h_t^1$:

$$h_{ti}^1 = P_{15}(C_{15}(P_{14}(C_{14}(P_{13}(C_{13}(P_{12}(C_{12}(P_{11}(C_{11}(x_t)))))))))))$$

$$h_{tj}^1 = P_{24}(C_{24}(P_{23}(C_{23}(P_{22}(C_{22}(P_{21}(C_{21}(x_t)))))))))$$

$$h_{tk}^1 = P_{33}(C_{33}(P_{32}(C_{32}(P_{31}(C_{31}(x_t))))))$$

$$h_{tl}^1 = P_{42}(C_{42}(P_{41}(C_{41}(x_t))))$$

$$h_{tm}^1 = P_{51}(C_{51}(x_t))$$

$$h_t^1 = D_{1t}[h_{ti}^1 h_{tj}^1 h_{tk}^1 h_{tl}^1 h_{tm}^1]^T \tag{3}$$

where in equation (3), $P_{ij}$ and $C_{ij}$ respectively represent a jth convolution operation and a jth pooling operation for an ith convolution path, $h_{ti}^1$ is a convolution output of data of the important level, $h_{tj}^1$ is a convolution output of data of the relatively important level, $h_{tk}^1$ is a convolution output of data of the general level, $h_{tl}^1$ is a convolution output of data of the relatively minor level, and $h_{tm}^1$ is a convolution output of data of the minor level.

Further, the extracting an output of the MCBLSTM model in step 4) specifically includes:

4-2-1) trend division: taking an output $h_t^1$ of the MBCNN model at time t and recursive data $h_{t-1}^2$ of the MCBLSTM model at time t−1 as input data of the MCBLSTM at time t, and inputting the input data to the bidirectional trend-level division unit for trend division, the bidirectional trend-level division unit including an FC layer FC3 and an FC layer FC4 for dividing a trend level of the input data along forward and backward directions, the FC layer FC3 and the FC layer FC4 each including five neurons, and the FC layer FC3 and the FC layer FC4 respectively having an output $\vec{D}_{2t}$ and output $\overleftarrow{D}_{2t}$:

$$\vec{D}_{2t} = \tanh\left(\vec{h}_t^1 \vec{w}_{xd_2} + \vec{h}_{t-1}^2 \vec{w}_{hd_2} + \vec{b}_{d_2}\right) \quad (4)$$

$$\overleftarrow{D}_{2t} = \tanh\left(\overleftarrow{h}_t^1 \overleftarrow{w}_{xd_2} + \overleftarrow{h}_{t-1}^2 \overleftarrow{w}_{hd_2} + \overleftarrow{b}_{d_2}\right)$$

where in equation (4), $\vec{w}_{xd_2}$ and $\vec{w}_{hd_2}$ each are a weight of the FC layer FC3, $\overleftarrow{w}_{xd_2}$ and $\overleftarrow{w}_{hd_2}$ each are a weight of the FC layer FC4, $\vec{b}_{d_2}$ is a bias of the FC layer FC3, and $\overleftarrow{b}_{d_2}$ is a bias of the FC layer FC4; and respectively performing a softmax operation on the $\vec{D}_{2t}$ and the $\overleftarrow{D}_{2t}$ to obtain forward and backward trend levels $\vec{D}_{2t}$ and $\overleftarrow{D}_{2t}$:

$$\vec{D}_{2t} = \text{soft max}(\vec{D}_{2t}) = [\vec{d}_{21t} \vec{d}_{22t} \vec{d}_{23t} \vec{d}_{24t} \vec{d}_{25t}]$$

$$\overleftarrow{D}_{2t} = \text{soft max}(\overleftarrow{D}_{2t}) = [\overleftarrow{d}_{21t} \overleftarrow{d}_{22t} \overleftarrow{d}_{23t} \overleftarrow{d}_{24t} \overleftarrow{d}_{25t}] \quad (5)$$

where in equation (5), $\vec{d}_{21t}(\overleftarrow{d}_{21t})$, $\vec{d}_{22t}(\overleftarrow{d}_{22t})$, $\vec{d}_{23t}(\overleftarrow{d}_{23t})$, $\vec{d}_{24t}(\overleftarrow{d}_{24t})$, and $\vec{d}_{25t}(\overleftarrow{d}_{25t})$ respectively represent a local trend, a medium and short-term trend, a medium-term trend, a medium and long-term trend and a global trend in bidirectional calculation, and $\vec{d}_{2\,max\,t}$ and $\overleftarrow{d}_{2\,max\,t}$ in $\vec{D}_{2t}$ and $\overleftarrow{D}_{2t}$ represent trend levels along two directions at the time t; and 4-2-2) feature extraction: inputting, according to the trend division results $\vec{D}_{2t}$ and $\overleftarrow{D}_{2t}$, data of different trends to the multicellular update units $\overset{\shortmid}{c}_t$ and $\overset{\partial}{c}_t$, which perform differential learning along the two directions, for update, the $\overset{\shortmid}{c}_t$ comprising five subunits $\bar{o}_t(i)$, $\bar{o}_t(j)$, $\bar{o}_t(k)$, $\bar{o}_t(l)$, $\bar{o}_t(m)$, and $\overset{\partial}{c}_t$ comprising five subunits $\overset{\partial}{c}_t(i)$, $\overset{\partial}{c}_t(j)$, $\overset{\partial}{c}_t(k)$, $\overset{\partial}{c}_t(l)$, and $\overset{\partial}{c}_t(m)$:

$$\overset{r}{i}_t = \sigma\left(\overset{r}{w}_{ih1} \overset{r1}{h}_t + \overset{r}{w}_{ih2} \overset{r2}{h}_{t-1} \overset{r}{b}_i\right) \quad (6)$$

-continued $$\overset{r}{f}_t = \sigma\left(\overset{r}{w}_{fh1} \overset{r1}{h}_t + \overset{r}{w}_{fh2} \overset{r2}{h}_{t-1} \overset{r}{b}_f\right)$$

$$\overset{s}{i}_t = \sigma\left(\overset{s}{w}_{ih1} \overset{s1}{h}_t + \overset{s}{w}_{ih2} \overset{s2}{h}_{t-1} \overset{s}{b}_i\right)$$

$$\overset{s}{f}_t = \sigma\left(\overset{s}{w}_{fh1} \overset{s1}{h}_t + \overset{s}{w}_{fh2} \overset{s2}{h}_{t-1} \overset{s}{b}_f\right)$$

$$\overset{r}{c}_t(m) = \overset{r}{c}_{t-1}$$

$$\overset{s}{c}_t(m) = \overset{s}{c}_{t-1}$$

$$\overset{r}{c}_t(i) = \frac{r}{c_t} = \tanh\left(\overset{r}{W}_{ch1} \overset{r1}{h}_t + \overset{r}{W}_{ch2} \overset{r2}{h}_{t-1} + \overset{r}{b}_c\right)$$

$$\overset{s}{c}_t(i) = \frac{s}{c_t} = \tanh\left(\overset{s}{W}_{ch1} \overset{s1}{h}_t + \overset{s}{W}_{ch2} \overset{s2}{h}_{t-1} + \overset{s}{b}_c\right)$$

$$\overset{r}{c}_t(k) = \overset{r}{f}_t e \overset{r}{c}_{t-1} + \overset{r}{i}_t e \frac{r}{c_t}$$

$$\overset{s}{c}_t(k) = \overset{s}{f}_t e \overset{s}{c}_{t-1} + \overset{s}{i}_t e \frac{s}{c_t}$$

$$\overset{r}{c}_t(l) = s_1\left(\overset{r}{f}_t e \overset{r}{c}_{t-1} + \overset{r}{i}_t e \frac{r}{c_t}\right) + (1 - s_1)\overset{r}{c}_{t-1}$$

$$\overset{s}{c}_t(l) = s_3\left(\overset{s}{f}_t e \overset{s}{c}_{t-1} + \overset{s}{i}_t e \frac{s}{c_t}\right) + (1 - s_3)\overset{s}{c}_{t-1}$$

$$\overset{r}{c}_t(j) = s_2\left(\overset{r}{f}_t e \overset{r}{c}_{t-1} + \overset{r}{i}_t e \frac{r}{c_t}\right) + (1 - s_2)\frac{r}{c_t}$$

$$\overset{s}{c}_t(j) = s_4\left(\overset{s}{f}_t e \overset{s}{c}_{t-1} + \overset{s}{i}_t e \frac{s}{c_t}\right) + (1 - s_5)\frac{s}{c_t}$$

where in equation (6), arrows → and ← respectively represent forward and backward processes, $\bar{o}_t(m)$, $\overset{\partial}{c}_t(m)$ are corresponding data update units of the global trend in the bidirectional calculation, $\bar{o}_t(i)$, $\overset{\partial}{c}_t(i)$ are corresponding data update units of the short-term trend in the bidirectional calculation, $\bar{o}_t(k)$, $\overset{\partial}{c}_t(k)$ are corresponding data update units of the medium-term trend in the bidirectional calculation, $\bar{o}_t(l)$, $\overset{\partial}{c}_t(l)$ are corresponding data update units of the medium and long-term trend in the bidirectional calculation, $\bar{o}_t(j)$, $\overset{\partial}{c}_t(j)$ are corresponding data update units of the medium and short-term trend in the bidirectional calculation, σ is a sigmod activation function, $\overset{l}{w}_{ih1}, \overset{s}{w}_{ih1}$ and $\overset{l}{w}_{ih2}, \overset{s}{w}_{ih2}$ are weights of input gates of the MCBLSTM model, $\overset{l}{W}_{fh1}, \overset{s}{W}_{fh1}$ and $\overset{l}{W}_{fh2}, \overset{s}{W}_{fh2}$ are weights of forget gates of the MCBLSTM model, $\overset{l}{w}_{ch1}, \overset{s}{w}_{ch1}$ and $\overset{l}{w}_{ch2}, \overset{s}{w}_{ch2}$ are weights of cell storage units of the MCBLSTM model, $\overset{l}{b}_i$ and $\overset{\partial}{b}_i$ are biases of the input gates of the MCBLSTM model, $\overset{l}{b}_f$ and $\overset{\partial}{b}_f$ are biases of the forget gates of the MCBLSTM model, $\overset{\shortmid}{b}_c$ and $\overset{\scriptscriptstyle\supset}{b}_c$ are biases of the cell storage units of the MCBLSTM model, $\odot$ is a dot product operation, and $s_1$, $s_2$, $s_3$ and $s_4$ each are a mix proportion factor obtained by learning; and combining weights of alienation outputs of daughter-cell units in the multicellular update units according to update results of five alienation units and the trend division results $\vec{D}_{2t}$ and $\bar{b}_{2t}$ to obtain outputs $\overset{\shortmid}{c}_t$ and $\overset{\scriptscriptstyle\supset}{c}_t$ of the multicellular update units, and controlling output gates $\vec{o}_t$ and $\bar{o}_t$ of the MCBLSTM model to obtain an output $h^2_t$ of the MCBLSTM model at the time t:

$$\vec{c}_t = \vec{D}_{2t}[\vec{c}_t(i)\,\vec{c}_t(j)\,\vec{c}_t(k)\,\vec{c}_t(l)\,\vec{c}_t(m)]^T$$

$$\bar{c}_t = \bar{D}_{2t}[\bar{c}_t(i)\,\bar{c}_t(j)\,\bar{c}_t(k)\,\bar{c}_t(l)\,\bar{c}_t(m)]^T$$

$$\vec{o}_t = \sigma(\vec{w}_{ox}\vec{h}_t^1 + \vec{w}_{oh}\vec{h}_{t-1}^2 + \vec{b}_o)$$

$$\bar{o}_t = \sigma(\bar{w}_{ox}\bar{h}_t^1 + \bar{w}_{oh}\bar{h}_{t-1}^2 + \bar{b}_o)$$

$$\vec{h}_t^2 = \vec{o}_t \Box \tanh(c_t)$$

$$\bar{h}_t^2 = \bar{o}_t \Box \tanh(\bar{c}_t)$$

$$h^2_t = \vec{h}_t^2 \oplus \bar{h}_t^2 \quad (7)$$

where in equation (7), $\overset{\shortmid}{w}_{ox}$, $\overset{\scriptscriptstyle\supset}{w}_{oh}$ and $\overset{\shortmid}{w}_{ox}$, $\overset{\scriptscriptstyle\supset}{w}_{oh}$ are weights of the output gates of the MCBLSTM model, and $\sigma$ and tanh each are an activation function.

Further, the predicting a RUL in step 5) specifically includes:

inputting $h^2_t$ to the FC layer FC1, preventing overfitting by Dropout to obtain an output $h^3_t$ of the FC layer FC1, and inputting the $h^3_t$ to the regression layer to obtain a predicted RUL $y_t$:

$$h_t^3 = \text{dropout}\left(Relu(w_{h_2h_3}h_t^2 + b_{h_3})\right) \quad (8)$$

$$y_t = \text{Linear}\left(w_{h_3y}h_t^3 + b_y\right) \quad (9)$$

where in equations (8) and (9), $w_{h_2h_3}$ is a weight of the FC layer FC1, $b_{h_3}$ is a bias of the FC layer FC1, $w_{h_3y}$ is a weight of the regression layer, and $b_y$ is a bias of the regression layer.

By adopting the foregoing technical solutions, the present disclosure achieves the following advantages:

1. The present disclosure constructs a deep mining model (ADLDNN model) according to different sensitivities of different measured values for mechanical faults in different periods, automatically screens features through the ADLDNN model and combines with differential learning, thereby improving the accuracy and generalization of RUL prediction.
2. Input data are classified by a level division unit of an MBCNN model. Classified data are input to an MBCNN, in which each branch can execute corresponding feature extraction in accordance with a level of its input data. A bidirectional trend-level division unit of the MBCNN model is used to classify output features of the MBCNN into various levels of degradation trends along the forward and backward directions. Multicellular update units are then used to perform corresponding feature learning on bidirectional trend levels of input features to output health indexes.

The present disclosure can better mine different degradation trends for a health state of the aero-engine.

Other advantages, objectives and features of the present disclosure will be illustrated in the subsequent description in some degree, and will be apparent to those skilled in the art in some degree based on study on the following description, or those skilled in the art may obtain teachings by practicing the present disclosure. The objectives and other advantages of the present disclosure can be implemented and obtained by the following description and claims.

BRIEF DESCRIPTION OF THE DRAWINGS

The accompanying drawings of the present disclosure are described as follows.

DETAILED DESCRIPTION OF THE EMBODIMENTS

The present disclosure will be further described below in conjunction with the accompanying drawings and embodiments.

Figure 1:
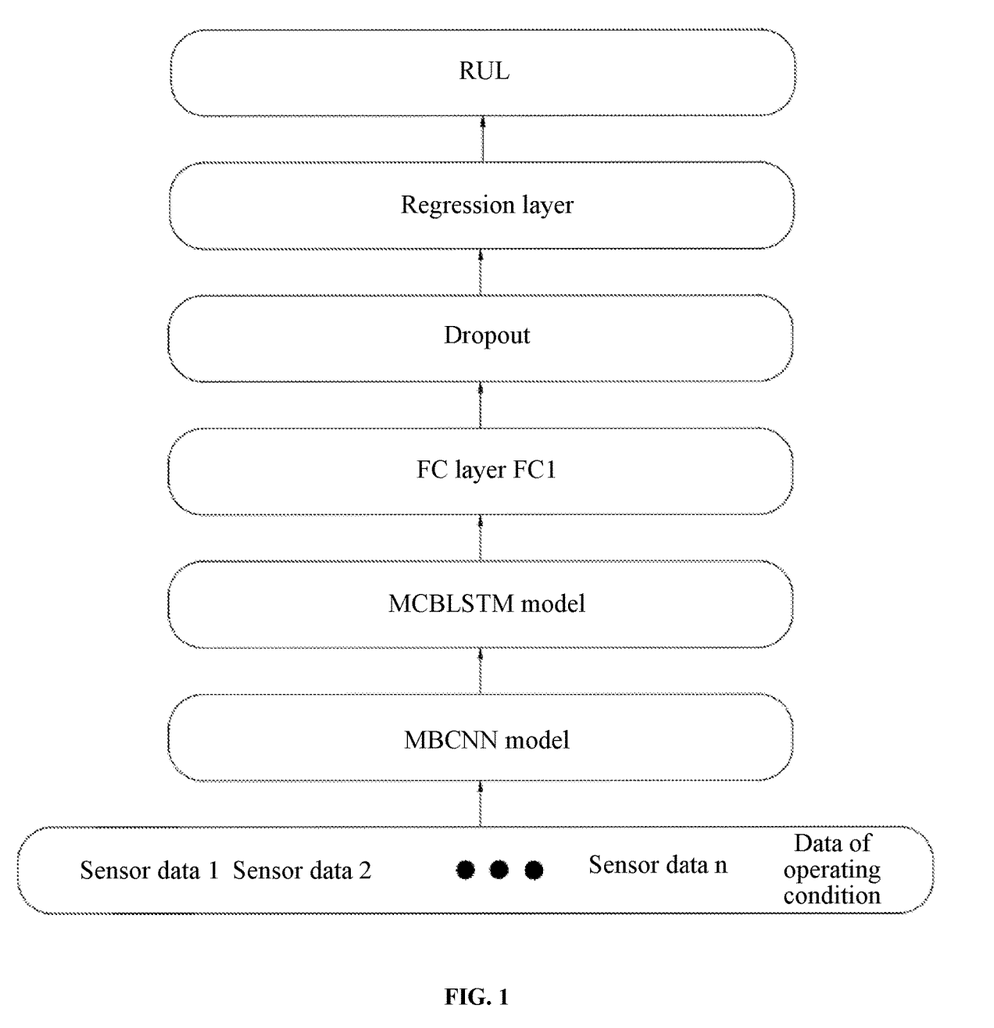
FIG. 1 is a flowchart of a method for predicting a RUL of an aero-engine according to the present disclosure.
Figure 2:
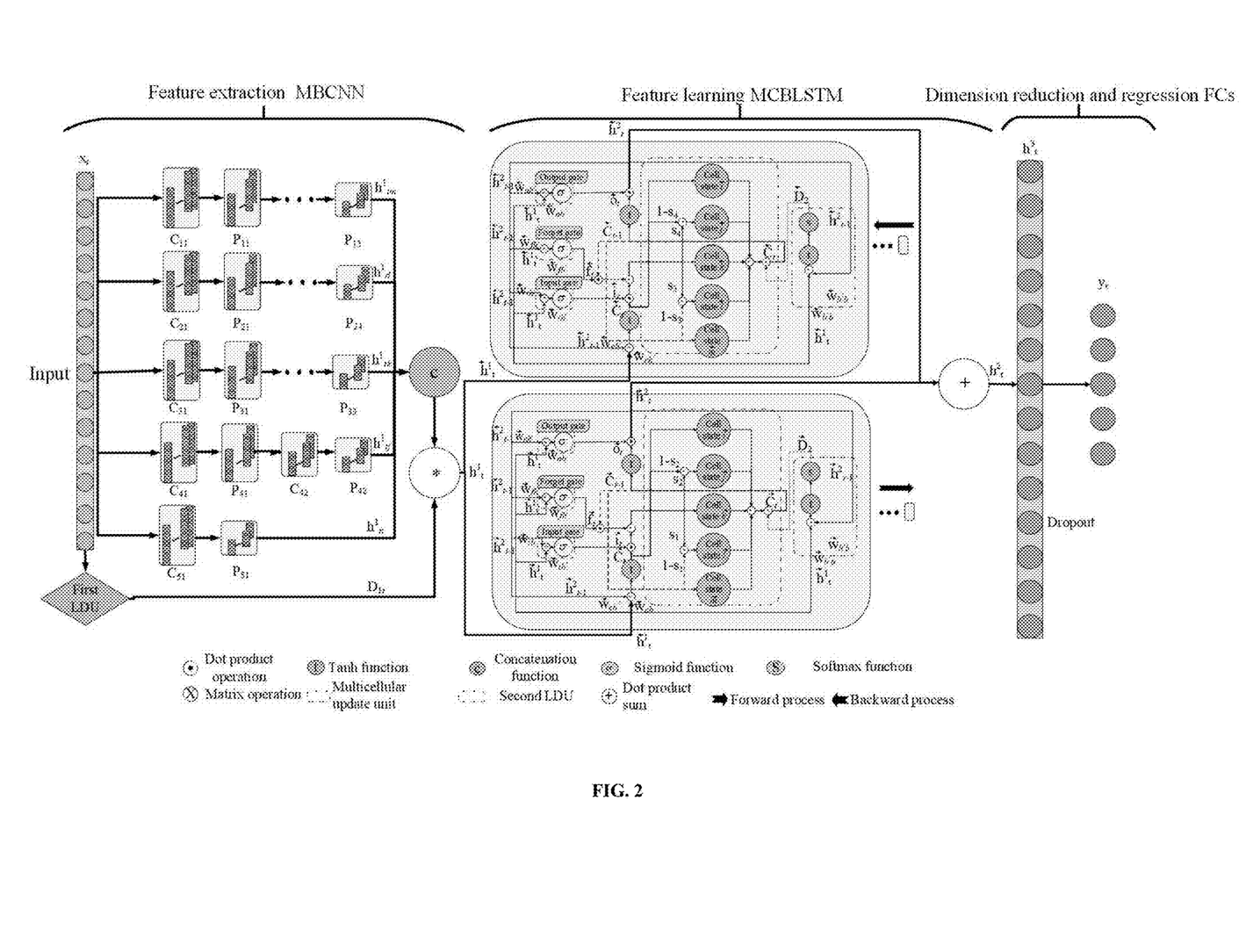
FIG. 2 is a structural view of an ADLDNN model according to the present disclosure.
Figure 3:
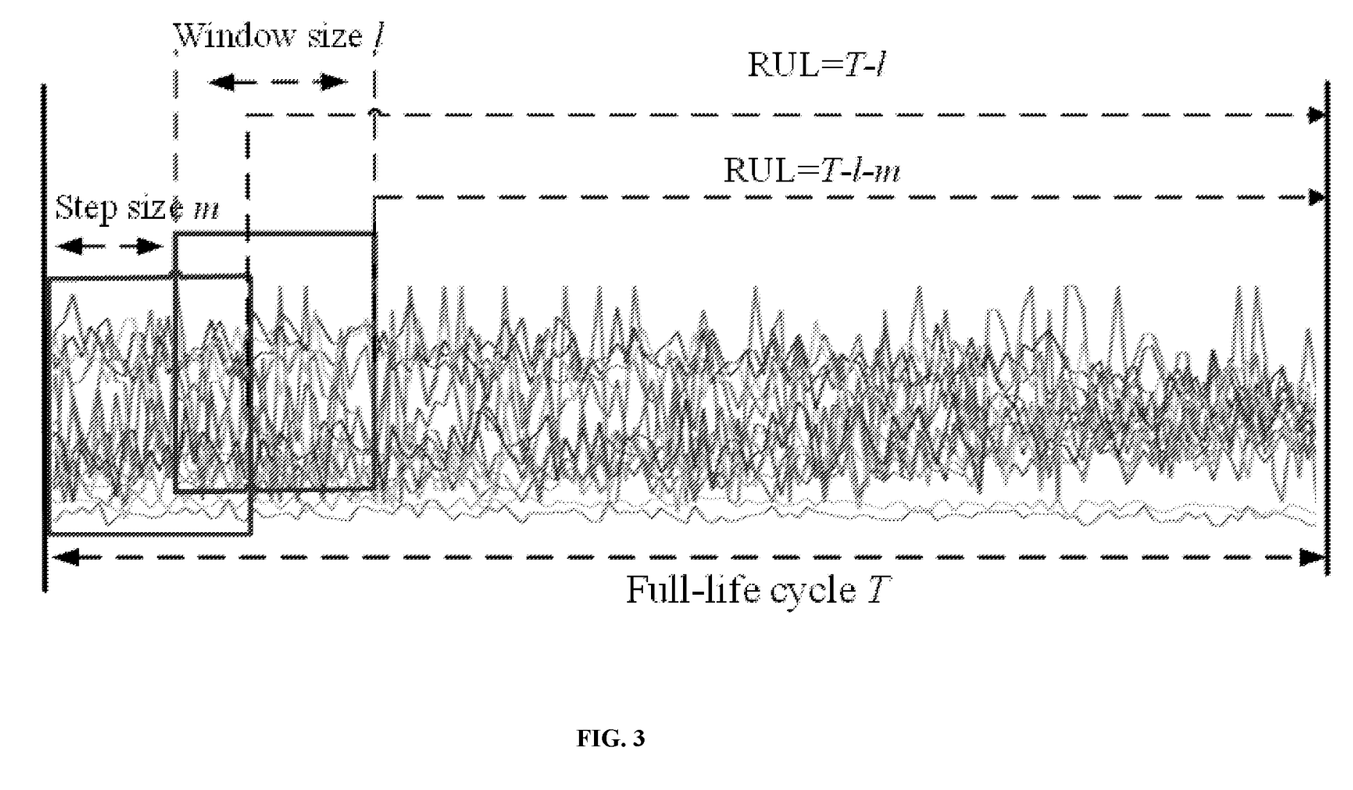
FIG. 3 is a schematic view of an SW for preprocessing data according to the present disclosure.

As shown in FIGS. 1-3, a method for predicting a RUL of an aero-engine based on an ADLDNN specifically includes the following steps:

1) Data acquisition: Multidimensional degradation parameters of an aero-engine to be predicted are acquired, a stable trend is analyzed, and a plurality of parameters capable of reflecting degradation performance of the aero-engine are selected to obtain acquired data, specifically:

1-1) Degradation data of the aero-engine are simulated by commercial modular aero-propulsion system simulation (C-MAPSS) to acquire the multidimensional degradation parameters of the aero-engine to be predicted, as shown in Table 1:

TABLE 1

| Outputs of 21 sensors in operation of the engine | | | | |
|---|---|---|---|---|
| | Symbol | Description | Unit | Trend |
| 1 | T2 | Total temperature at fan inlet | ° R | — |
| 2 | T24 | Total temperature at low pressure compressor (LPC) outlet | ° R | ↑ |
| 3 | T30 | Total temperature at high pressure compressor (HPC) outlet | ° R | ↑ |
| 4 | T50 | Total temperature at low pressure turbine (LPT) outlet | ° R | ↑ |
| 5 | P2 | Pressure at fan inlet | psia | — |
| 6 | P15 | Total pressure in bypass-duct | psia | — |
| 7 | P30 | Total pressure at HPC outlet | psia | ↓ |
| 8 | Nf | Physical fan speed | rpm | ↑ |

TABLE 1-continued

Outputs of 21 sensors in operation of the engine

| | Symbol | Description | Unit | Trend |
|---|---|---|---|---|
| 9 | Nc | Physical core speed | rpm | ↑ |
| 10 | Epr | Engine pressure ratio | — | — |
| 11 | Ps30 | Static pressure at HPC outlet | psia | ↑ |
| 12 | Phi | Ratio of fuel flow to Ps30 | pps/psi | ↓ |
| 13 | NRf | Corrected fan speed | rpm | ↑ |
| 14 | NRc | Corrected core speed | rpm | ↓ |
| 15 | BPR | Bypass ratio | — | ↑ |
| 16 | farB | Burner fuel-air ratio | — | — |
| 17 | htBleed | Bleed enthalpy | — | ↑ |
| 18 | NF_dmd | Demanded fan speed | rpm | — |
| 19 | PCNR_dmd | Demanded Corrected fan speed | rpm | — |
| 20 | W31 | High pressure turbine (HPT) coolant bleed | lbm/s | ↓ |
| 21 | W32 | LPT coolant bleed | lbm/s | ↓ |

As shown in Table 2, the C-MAPSS dataset is divided into four sub-datasets according to different operating conditions and fault modes:

TABLE 2

C-MAPSS dataset

| Subset | FD001 | FD002 | FD003 | FD004 |
|---|---|---|---|---|
| Number of engines | 100 | 260 | 100 | 249 |
| Operating condition | 1 | 6 | 1 | 6 |
| Fault mode | 1 | 1 | 2 | 2 |
| Maximum running cycle | 362 | 378 | 525 | 543 |
| Minimum running cycle | 128 | 128 | 145 | 128 |

Each sub-dataset contains training data, test data and an actual RUL corresponding to the test data. The training data contain all the engine data from a certain health state to the fault, while the test data are data before the engine running fault. Moreover, the training and test data respectively contain a certain number of engines with different initial health states.

Due to the different initial health states of the engines, the running cycles of different engines in a same database are different. Taking the FD001 dataset as an example, the training dataset includes 100 engines, with a maximum running cycle of 362, and a minimum running cycle of 128. In order to fully prove the superiority of the method, a simplest subset (namely the subset FD001 having a single operating condition and a single fault mode) and a most complex subset (namely the subset FD004 having various operating conditions and various fault modes) are taken as experimental data.

1-2) Some stable trend measurements (measurement data of sensors 1, 5, 6, 10, 16, 18 and 19) are excluded in advance. These sensors are unsuitable for RUL prediction, because their full-life cycle measurement curves are stable and constant, namely containing less degradation information of the engine, and operating conditions have a significant impact on a prediction capability of the model. Therefore, measurements and operating conditions of screened 14 sensors are formed into original data to obtain the acquired data.

Figure 4:
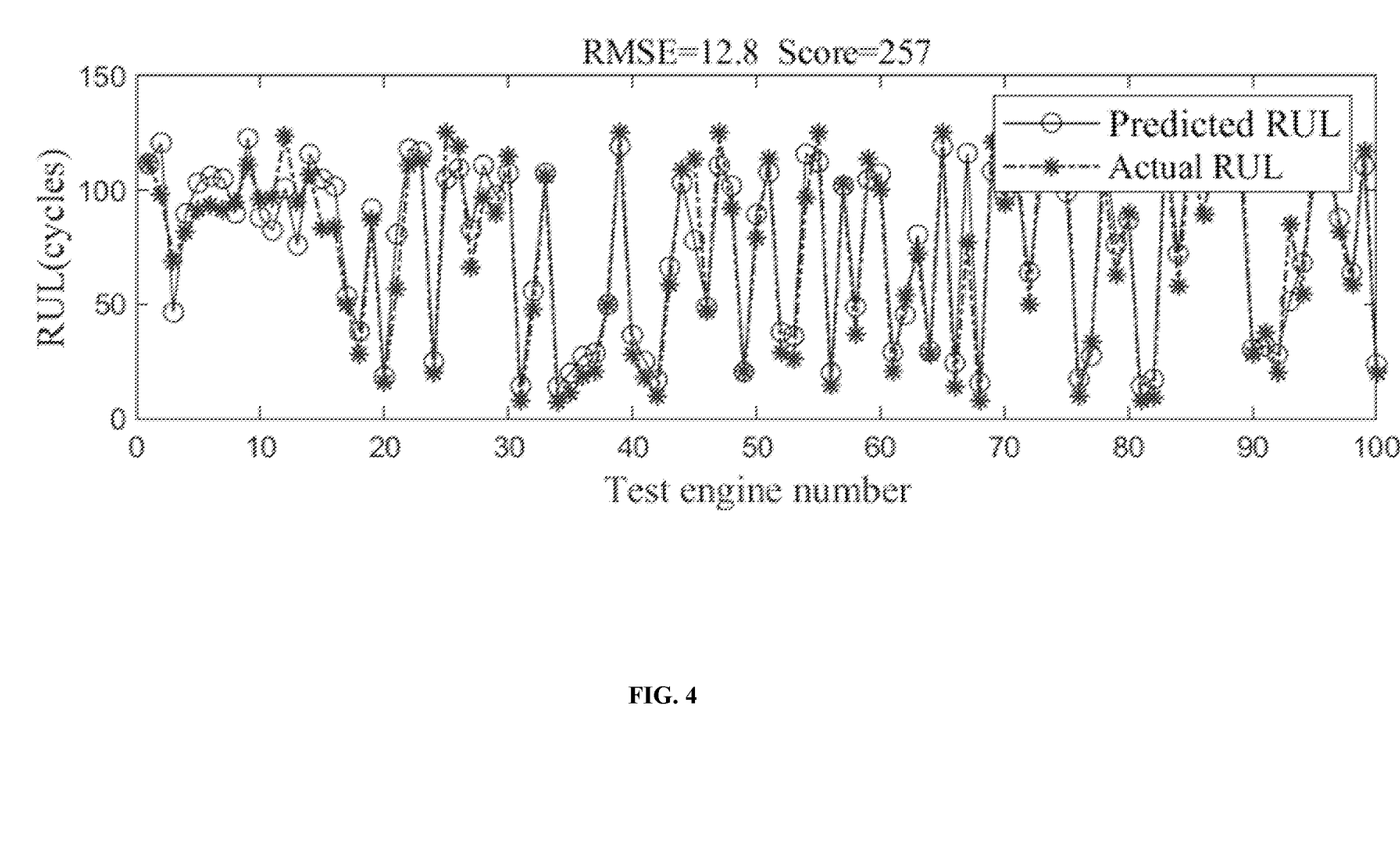
FIG. 4 illustrates a predicted result on a subset FD001 according to a prediction method of the present disclosure.
Figure 5:
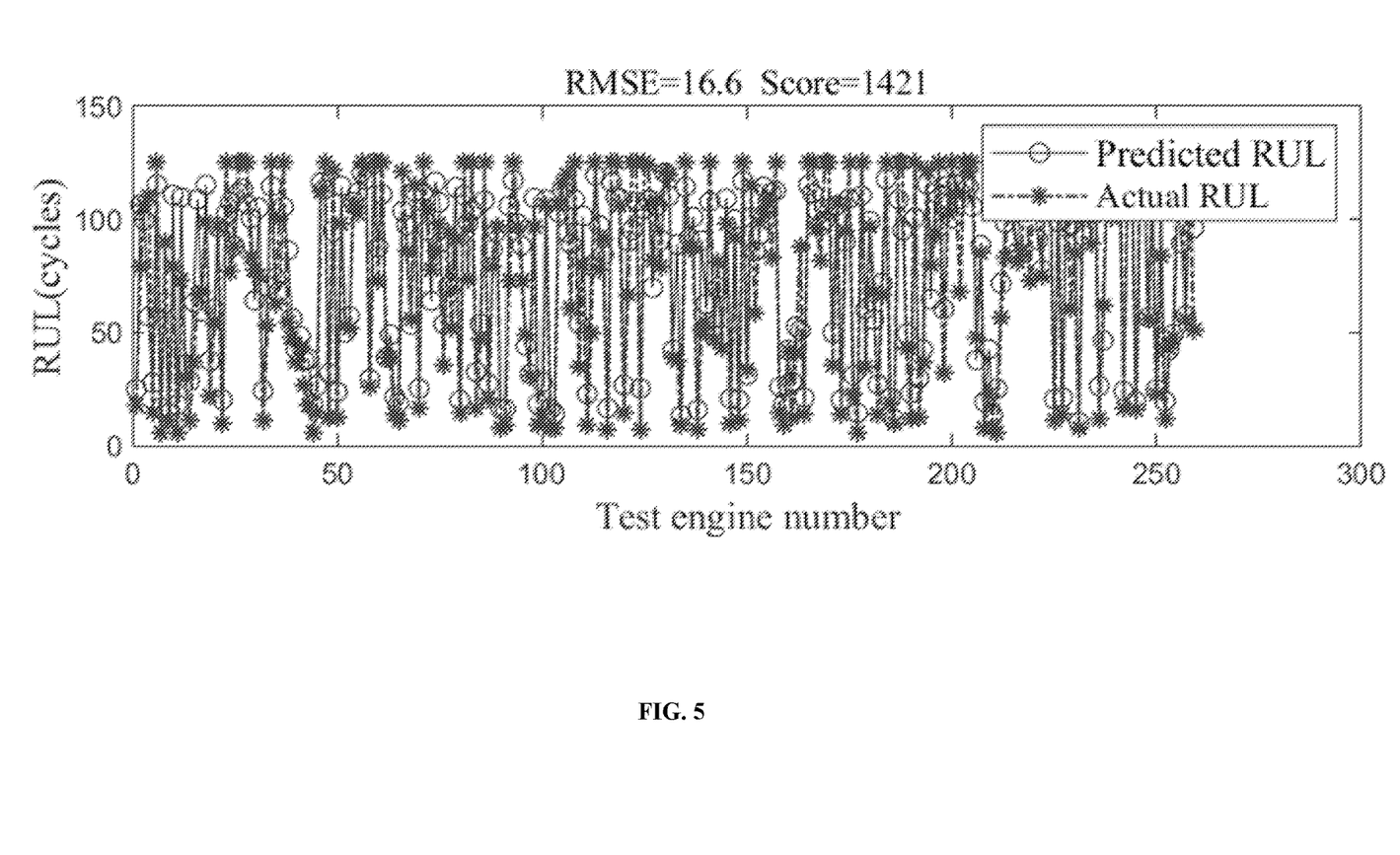
FIG. 5 illustrates a predicted result on a subset FD002 according to a prediction method of the present disclosure.
Figure 6:
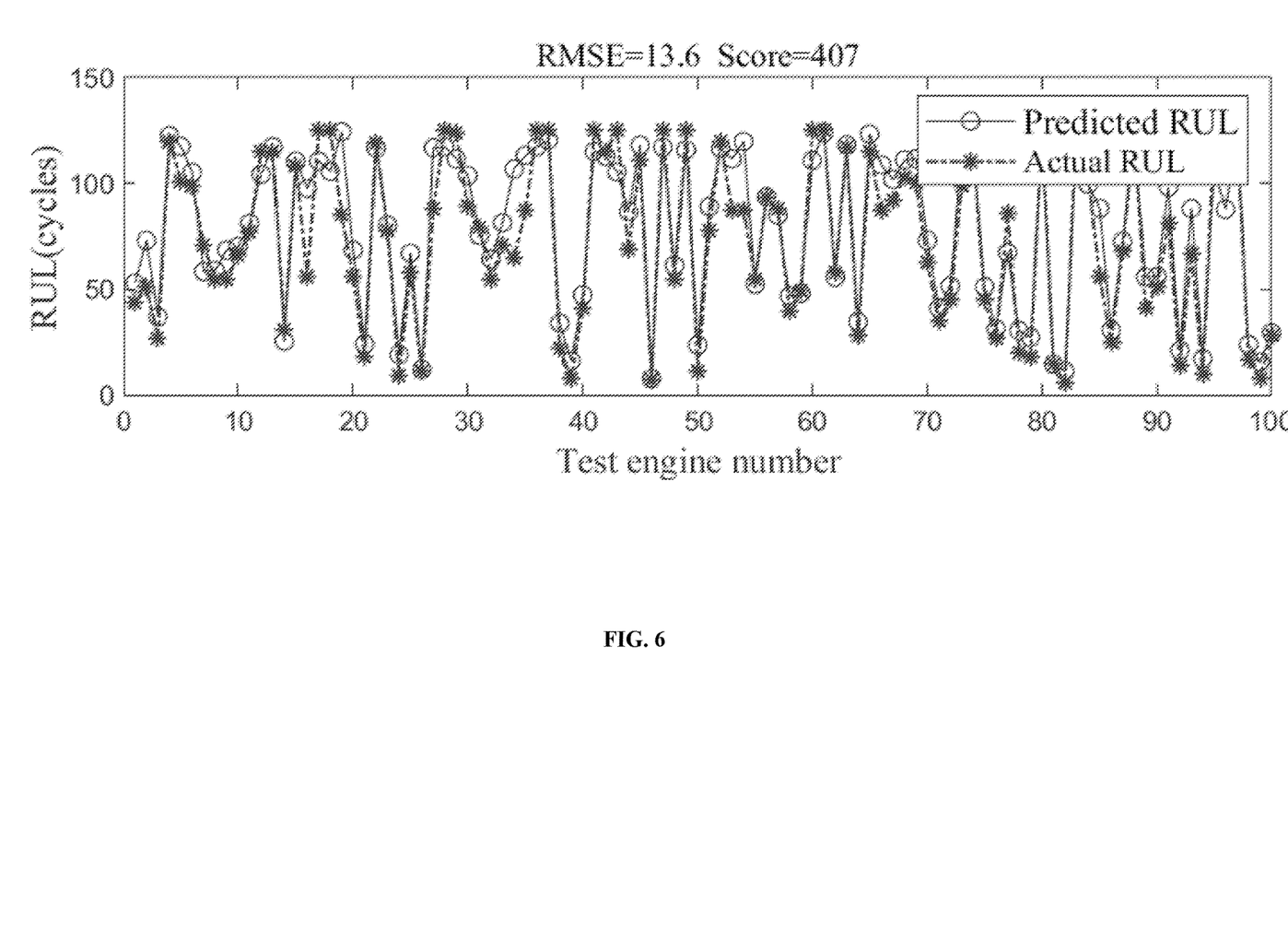
FIG. 6 illustrates a predicted result on a subset FD003 according to a prediction method of the present disclosure.
Figure 7:
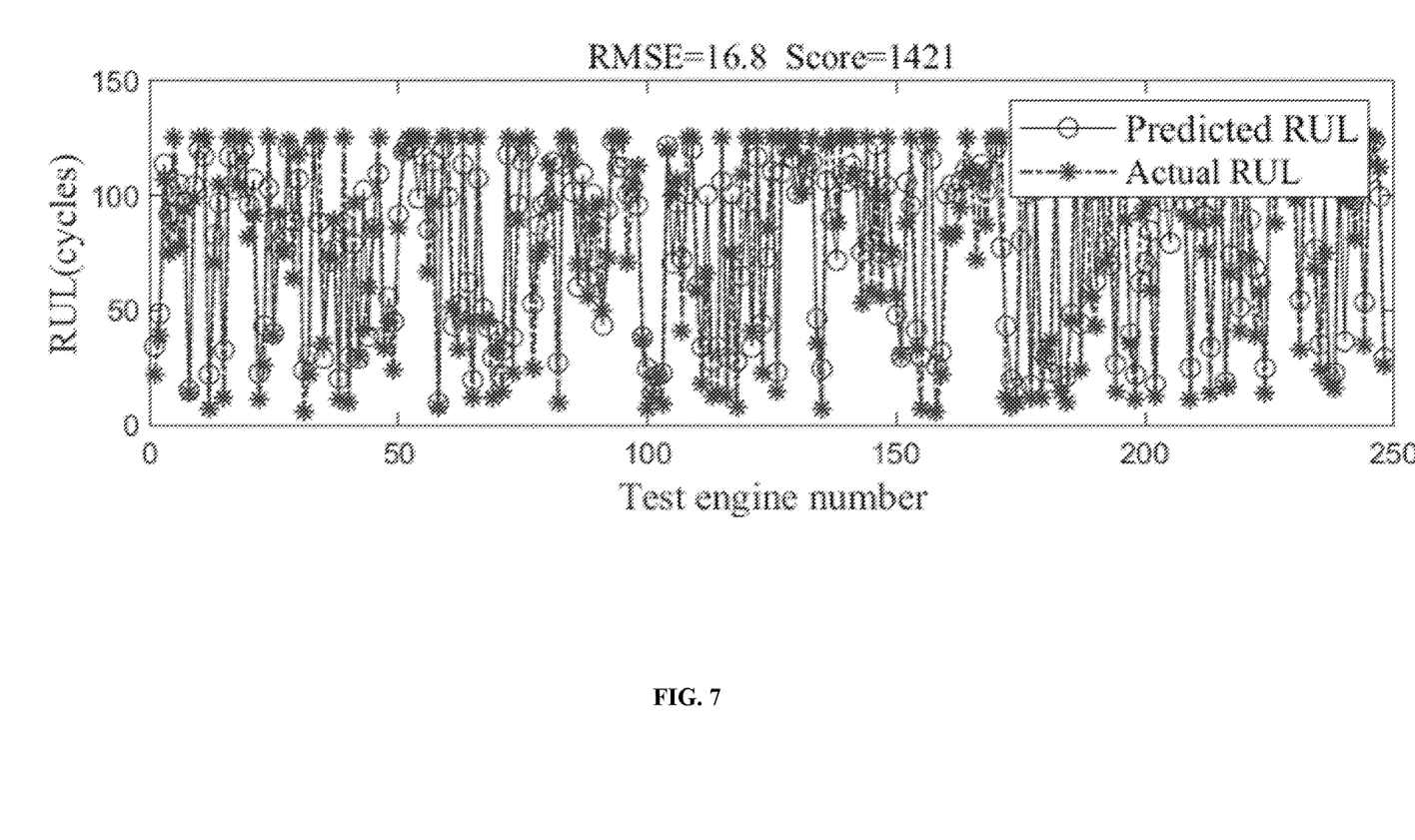
FIG. 7 illustrates a predicted result on a subset FD004 according to a prediction method of the present disclosure.

2) Data preprocessing: The acquired data are segmented by an SW to obtain preprocessed data, specifically:

As shown in FIG. 4, assuming that the full-life cycle of the engine is T, the sliding window size is l, and the sliding step size is m, an i th input sample has a size of l×n, n being a sum of a number of selected sensors and a number of dimensions for information of operating conditions.

When the i th sample is input, the actual RUL is T−l−(i−1)×m.

RUL labels are constructed by a piece-wise linear RUL technology, and are defined as follows:

$$Rul = \begin{cases} Rul, & \text{if } Rul \leq Rul_{max} \\ Rul_{max} & \text{if } Rul > Rul_{max} \end{cases} \quad (10)$$

In Equation (10), $Rul_{max}$ is a maximum RUL and a preset threshold.

In the example of the present disclosure, for FD001 and FD004, the maximum RUL is 130 cycles and 150 cycles respectively, while the sliding window size l is 30, and the sliding step size m is 1. There are 17,731 and 54,028 training samples for the FD001 and the FD004. Both the FD001 and the FD004 contain 100,248 test samples, because only the last measured value of the test set is used to validate the prediction capability.

3) Model construction: A RUL prediction model of the aero-engine is constructed based on an ADLDNN, the RUL prediction model including an MBCNN model, an MCBLSTM model, an FC layer FC1, and a regression layer.

The MBCNN model includes a level division unit, and a spatial feature alienation-extraction unit.

The MCBLSTM model includes a bidirectional trend-level division unit, and multicellular update units.

4) Feature extraction: The preprocessed data are taken as input data of the MBCNN model, an output of the MBCNN model is extracted, the output of the MBCNN model and recursive data are taken as input data of the MCBLSTM model, and an output of the MCBLSTM model is extracted, specifically:

4-1) The step of extracting an output of the MBCNN model specifically includes:

4-1-1) Level division: The preprocessed data in Step 2) are taken as the input data, input data $x_t$ at time t are input to the level division unit of the MBCNN model for level division, the level division unit including an FC layer FC2 composed of five neurons, and softmax normalization is performed on an output $D_t$ of the FC layer FC2 to obtain a level division result $D_{1t}$:

$$D_t = \tanh(w_{xd_1} x_t + b_{d_1}) \quad (11)$$

$$D_{1t} = \text{soft max}(D_t) = [d_{11t}, d_{12t}, d_{13t}, d_{14t}, d_{15t}] \quad (12)$$

In Equations (11) and (12), $w_{xd_1}$ and $b_{d_1}$ respectively represent a weight and a bias of the FC layer FC2, $d_{11t}$, $d_{12t}$, $d_{13t}$, $d_{14t}$ and $d_{15t}$ respectively represent an important level, a relatively important level, a general level, a relatively minor level and a minor level, and a position of a maximal element in $D_{1t}$ represents a level division result of a present input.

4-1-2) Feature extraction: According to a level division result $D_1$ of the input data, the input data are input to different convolution paths of the spatial feature alienation-extraction unit for convolution, and automatic differential processing is performed on an input measured value according to the level division result and five designed convolution paths to obtain a health feature $h_t^1$:

$$h_{ti}^1 = P_{15}(C_{15}(P_{14}(C_{14}(P_{13}(C_{13}(P_{12}(C_{12}(P_{11}(C_{11}(x_t)))))))))))$$

$$h_{tj}^1 = P_{24}(C_{24}(P_{23}(C_{23}(P_{22}(C_{22}(P_{21}(C_{21}(x_t)))))))))$$

$h_{tk}^1 = P_{33}(C_{33}(P_{32}(C_{32}(P_{31}(C_{31}(x_t))))))$ $h_{tl}^1 = P_{43}(C_{42}(P_{41}(C_{41}(x_t))))$ $h_{tm}^1 = P_{51}(C_{51}(x_t))$ $h_t^1 = D_{1t}[h_{ti}^1 h_{tj}^1 h_{tk}^1 h_{tl}^1 h_{tm}^1]^T$ (13)

In Equation (13), $P_{ij}$ and $C_{ij}$ respectively represent a jth convolution operation and a jth pooling operation for an ith convolution path, $h_{ti}^1$ is a convolution output of data of the important level, $h_{tj}^1$ is a convolution output of data of the relatively important level, $h_t^1$ is a convolution output of data of the general level, $h_{tl}^1$ is a convolution output of data of the relatively minor level, and $h_{tm}^1$ is a convolution output of data of the minor level.

Further, the step of extracting an output of the MCBL-STM model specifically includes:

4-2-1) Trend division: An output $h_t^1$ of the MBCNN model at time t and recursive data $h_{t-1}^2$ of the MCBL-STM model at time t−1 are taken as input data of the MCBLSTM at time t, and input to the bidirectional trend-level division unit for trend division, the bidirectional trend-level division unit including an FC layer FC3 and an FC layer FC4 for dividing a trend level of the input data along forward and backward directions, the FC layer FC3 and the FC layer FC4 each including five neurons, and the FC layer FC3 and the FC layer FC4 respectively having an output $\vec{D}^2_{2t}$ and an output $\overset{\leftarrow}{D}_{2t}$:

$\vec{D}_{2t} = \tanh(\vec{h}_t^1 \vec{w}_{xd_2} + \vec{h}_{t-1}^2 \vec{w}_{hd_2} + \vec{b}_{d_2})$ $\overset{\leftarrow}{D}_{2t} = \tanh(\overset{\leftarrow}{h}_t^1 \overset{\leftarrow}{w}_{xd_2} + \overset{\leftarrow}{h}_{t-1}^2 \overset{\leftarrow}{w}_{hd_2} + \overset{\leftarrow}{b}_{d_2})$ In Equation (14), $\vec{w}_{xd_2}$ and $\vec{w}_{hd_2}$ each are a weight of the FC layer FC3, $\overset{\leftarrow}{w}_{xd_2}$ and $\overset{\leftarrow}{w}_{hd_2}$ each are a weight of the FC layer FC4, $\vec{b}_{d_2}$ is a bias of the FC layer FC3, and $\overset{\leftarrow}{b}_{d_2}$ is a bias of the FC layer FC4.

A softmax operation is respectively performed on the $\vec{D}^2_{2t}$ and the $\overset{\leftarrow}{D}_{2t}$ to obtain forward and backward trend levels $\vec{D}_{2t}$ and $\overset{\leftarrow}{D}_{2t}$:

$\vec{D}_{2t} = \text{soft max}(\vec{D}^2_{2t}) = [\vec{d}_{21t} \vec{d}_{22t} \vec{d}_{23t} \vec{d}_{24t} \vec{d}_{25t}]$ $\overset{\leftarrow}{D}_{2t} = \text{soft max}(\overset{\leftarrow}{D}_{2t}) = [\overset{\leftarrow}{d}_{21t} \overset{\leftarrow}{d}_{22t} \overset{\leftarrow}{d}_{23t} \overset{\leftarrow}{d}_{24t} \overset{\leftarrow}{d}_{25t}]$ (15)

In Equation (15), $\vec{d}_{21t}(\overset{\leftarrow}{d}_{21t})$, $\vec{d}_{22t}(\overset{\leftarrow}{d}_{22t})$, $\vec{d}_{23t}(\overset{\leftarrow}{d}_{23t})$, $\vec{d}_{24t}(\overset{\leftarrow}{d}_{24t})$, and $\vec{d}_{25t}(\overset{\leftarrow}{d}_{25t})$ respectively represent a local trend, a medium and short-term trend, a medium-term trend, a medium and long-term trend and a global trend in bidirectional calculation, and $\vec{d}_{2\ max\ t}$ and $\overset{\leftarrow}{d}_{2\ max\ t}$ in $\vec{D}_{2t}$ and $\overset{\leftarrow}{D}_{2t}$ represent trend levels along two directions at the time t.

4-2-2) Feature extraction: According to the trend division results $\vec{d}_{2t}$ and $\overset{\leftarrow}{D}_{2t}$, data of different trends are input to the multicellular update units $\vec{c}_t$ and $\overset{\leftarrow}{c}_t$, and which perform differential learning along the two directions, for update, the $\vec{c}_t$ comprising five subunits $\vec{c}_t(i)$, $\vec{c}_t(j)$, $\vec{c}_t(k)$, $\vec{c}_t(l)$, $\vec{c}_t(m)$, and the comprising five subunits $\overset{\leftarrow}{c}_t(i)$, $\overset{\leftarrow}{c}_t(j)$, $\overset{\leftarrow}{c}_t(k)$, $\overset{\leftarrow}{c}_t(l)$, and $\overset{\leftarrow}{c}_t(m)$:

$$\vec{i}_t = \sigma(\vec{w}_{ih1}^{r1} \vec{h}_t^{r} + \vec{w}_{ih2}^{r2} \vec{h}_{t-1}^{r} \vec{b}_i)$$ (16)

$$\vec{f}_t = \sigma(\vec{w}_{fh1}^{r1} \vec{h}_t^{r} + \vec{w}_{fh2}^{r2} \vec{h}_{t-1}^{r} \vec{b}_f)$$

$$\overset{\leftarrow}{i}_t = \sigma(\overset{\leftarrow}{w}_{ih1}^{s1} \overset{\leftarrow}{h}_t^{s} + \overset{\leftarrow}{w}_{ih2}^{s2} \overset{\leftarrow}{h}_{t-1}^{s} \overset{\leftarrow}{b}_i)$$

$$\overset{\leftarrow}{f}_t = \sigma(\overset{\leftarrow}{w}_{fh1}^{s1} \overset{\leftarrow}{h}_t^{s} + \overset{\leftarrow}{w}_{fh2}^{s2} \overset{\leftarrow}{h}_{t-1}^{s} \overset{\leftarrow}{b}_f)$$

$$\vec{c}_t(m) = \vec{c}_{t-1}$$

$$\overset{\leftarrow}{c}_t(m) = \overset{\leftarrow}{c}_{t-1}$$

$$\vec{\tilde{c}}_t(i) = \frac{\vec{r}}{c_t} = \tanh(\vec{W}_{ch1}^{r1} \vec{h}_t + \vec{W}_{ch2}^{r2} \vec{h}_{t-1} + \vec{b}_c)$$

$$\overset{\leftarrow}{\tilde{c}}_t(i) = \frac{\overset{\leftarrow}{s}}{c_t} = \tanh(\overset{\leftarrow}{W}_{ch1}^{s1} \overset{\leftarrow}{h}_t + \overset{\leftarrow}{W}_{ch2}^{s2} \overset{\leftarrow}{h}_{t-1} + \overset{\leftarrow}{b}_c)$$

$$\vec{c}_t(k) = \vec{f}_t e \vec{c}_{t-1} + \vec{i}_t e \frac{\vec{r}}{c_t}$$

$$\overset{\leftarrow}{c}_t(k) = \overset{\leftarrow}{f}_t e \overset{\leftarrow}{c}_{t-1} + \overset{\leftarrow}{i}_t e \frac{\overset{\leftarrow}{s}}{c_t}$$

$$\vec{c}_t(l) = s_1\left(\vec{f}_t e \vec{c}_{t-1} + \vec{i}_t e \frac{\vec{r}}{c_t}\right) + (1-s_1)\vec{c}_{t-1}$$

$$\overset{\leftarrow}{c}_t(l) = s_3\left(\overset{\leftarrow}{f}_t e \overset{\leftarrow}{c}_{t-1} + \overset{\leftarrow}{i}_t e \frac{\overset{\leftarrow}{s}}{c_t}\right) + (1-s_3)\overset{\leftarrow}{c}_{t-1}$$

$$\vec{c}_t(j) = s_2\left(\vec{f}_t e \vec{c}_{t-1} + \vec{i}_t e \frac{\vec{r}}{c_t}\right) + (1-s_2)\frac{\vec{r}}{c_t}$$

$$\overset{\leftarrow}{c}_t(j) = s_4\left(\overset{\leftarrow}{f}_t e \overset{\leftarrow}{c}_{t-1} + \overset{\leftarrow}{i}_t e \frac{\overset{\leftarrow}{s}}{c_t}\right) + (1-s_5)\frac{\overset{\leftarrow}{s}}{c_t}$$

In Equation (16), arrows → and ← respectively represent forward and backward processes, $\vec{c}_t(m)$, $\overset{\leftarrow}{c}_t(m)$ are corresponding data update units of the global trend in the bidirectional calculation, $\vec{c}_t(i)$, $\overset{\leftarrow}{c}_t(i)$ are corresponding data update units of the short-term trend in the bidirectional calculation, $\vec{c}_t(k)$, $\overset{\leftarrow}{c}_t(k)$ are corresponding data update units of the medium-term trend in the bidirectional calculation, $\vec{c}_t(l)$, $\overset{\leftarrow}{c}_t(l)$ are corresponding data update units of the medium and long-term trend in the bidirectional calculation, $\vec{c}_t(j)$, $\overset{\leftarrow}{c}_t(j)$ are corresponding data update units of the medium and short-term trend in the bidirectional calculation, σ is a sigmod activation function, $\vec{w}_{ih}^1$, $\overset{\leftarrow}{w}_{ih}^1$ and $\vec{w}_{ih}^2$, $\overset{\leftarrow}{w}_{ih}^2$ are weights of input gates of the MCBLSTM model, $\vec{w}_{fh}^1$, $\overset{\leftarrow}{w}_{fh}^1$ and $\vec{w}_{fh}^2$, $\overset{\leftarrow}{w}_{fh}^2$ are weights of forget gates of the MCBLSTM model, $\vec{w}_{ch}^1$, $\overset{\leftarrow}{w}_{ch}^1$ and $\vec{w}_{ch}^2$, $\overset{\leftarrow}{w}_{ch}^2$ are weights of cell storage units of the MCBLSTM model, $\vec{b}_i$ and $\overset{\leftarrow}{b}_i$ are biases of the input gates of the MCBLSTM model, $\vec{b}_f$ and $\overset{\leftarrow}{b}_f$ are biases of the forget gates of the MCBLSTM model, $\vec{b}_c$ and $\vec{b}_c$ are biases of the cell storage units of the MCBLSTM model, ⊙ is a dot product operation, and $s_1$, $s_3$, $s_3$ and $s_4$ each are a mix proportion factor obtained by learning.

Weights of alienation outputs of daughter-cell units in the multicellular update units are combined according to update results of five alienation units and the trend division results $\vec{D}_{2t}$ and $\bar{D}_{2t}$ obtain outputs $\vec{c}_t$ and $\bar{c}_t$ of the multicellular update units, and controlling output gates $\vec{o}_t$ and $\bar{o}_t$ of the MCBLSTM model to obtain an output $h^2_t$ of the MCBLSTM model at the time t:

$$\vec{c}_t = \vec{D}_{2t}[\vec{c}_t(i)\ \vec{c}_t(j)\ \vec{c}_t(k)\ \vec{c}_t(l)\ \vec{c}_t(m)]^T$$

$$\bar{c}_t = \bar{D}_{2t}[\ \bar{c}_t(i)\ \bar{c}_t(j)\ \bar{c}_t(k)\ \bar{c}_t(l)\ \bar{c}_t(m)]^T$$

$$\vec{o}_t = \sigma(\vec{w}_{ox}\vec{h}_t^1 + \vec{w}_{oh}\vec{h}_{t-1}^2 + \vec{b}_o)$$

$$\bar{o}_t = \sigma(\bar{w}_{ox}\bar{h}_t^1 + \bar{w}_{oh}\bar{h}_{t-1}^2 + \bar{b}_o)$$

$$\vec{h}_t^2 = \vec{o}_t \square \tanh(\vec{c}_t)$$

$$\bar{h}_t^2 = \bar{o}_t \square \tanh(\bar{c}_t)$$

$$h_t^2 = \vec{h}_t^2 \oplus \bar{h}_t^2 \quad (17)$$

In Equation (17), $\vec{w}_{ox}$, $\vec{w}_{oh}$ and $\bar{w}_{ox}$, $\bar{w}_{oh}$ are weights of the output gates of the MCBLSTM model, and σ and tanh each are an activation function.

In the example of the present disclosure, in order to keep the global trend as long as possible, the cell units $\vec{c}_t(k)$ and $\bar{c}_t(k)$ are updated from a state at previous time. In order to replace the local trend timely, the units $\vec{c}_t(k)$ and $\bar{c}_t(k)$ are updated from an internal state at this time. According to the conventional cell update mechanism in the BLSTM, $\vec{c}_t(k)$ and $\bar{c}_t(k)$ in the medium-term trend are updated with $\vec{c}_t(k)$ and $\bar{c}_t(k)$ in the global trend as well as $\vec{c}_t(k)$ and $\bar{c}_t(k)$ in the local trend, the units in the medium and long-term trend are updated with $\vec{c}_t(k)$ and $\bar{c}_t(k)$ in the global trend as well as $\vec{c}_t(k)$ and $\bar{c}_t(k)$ in the medium-term trend, and the units in the medium and short-term trend are updated with $\vec{c}_t(k)$ and $\bar{c}_t(k)$ in the medium-term trend as well as $h^2_t$ and $h^2_t$ in the local trend.

5) RUL prediction: The output of the MCBLSTM model is taken as an input of the FC layer FC1 to obtain an output of the FC layer FC1, and the output of the FC layer FC1 is input to the regression layer to predict a RUL, specifically: $h^2_t$ is input to the FC layer FC1, overfitting is prevented by Dropout to obtain an output $h^3_t$ of the FC layer FC1, and the $h^3_t$ is input to the regression layer to obtain a predicted RUL $y_t$:

$$h_t^3 = \text{dropout}\left(Relu(w_{h_2 h_3} h_t^2 + b_{h_3})\right) \quad (18)$$

$$y_t = \text{Linear}\left(w_{h_3 y} h_t^3 + b_y\right) \quad (19)$$

In Equations (18) and (19), $w_{h_2 h_3}$ is a weight of the FC layer FC1, $b_{h_3}$ is a bias of the FC layer FC1, $w_{h_3 y}$ is a weight of the regression layer, and $b_y$ is a bias of the regression layer.

In the example of the present disclosure, there are N samples in training. A mean square error (MSE) is defined as a loss function and calculated by:

$$MSE \text{ Loss} = \frac{1}{2}\sum_{i=1}^{N}(\overline{Rul}_i - Rul_i)^2 \quad (20)$$

In Equation (20), $\overline{Rul}_i$ and are $Rul_i$ respectively a predicted RUL and an actual RUL of an ith sample. An error gradient of each level is obtained by back propagation, and a weight parameter of the model is optimized by Adam optimization. The Dropout is used to prevent the overfitting in deep learning (DL).

Hyper-parameters of the ADLDNN are selected by a grid search method:

C11, C12, C13, C14, C15, C21, C22, C23, C24, C31, C32, C33, C41, C42, and C51 respectively have a kernel size of 1, 2, 2, 2, 2, 2, 2, 2, 2, 2, 2, 7, 2, 2, 2, and 9.

P11, P12, P13, P14, P14, P21, P22, P23, P24, P31, P32, P33, P41, P42, and P51 respectively have a maximum pooling size of 2, 1, 1, 1, 1, 1, 1, 1, 1, 2, 1, 1, 2, and 2.

It is assumed that the convolution kernel has a step size of 1, the MCBLSTM has 30 neurons, the FC layer FC1 has 30 neurons, and the regression layer has one neuron. The Dropout is set as 0.5, and the window size and the step size are respectively set as 30 and 1.

6) Experimental validation:

6-1) Evaluation indexes: A score and a root-mean-square error (RMSE) of IEEE are taken as evaluation indexes to quantitatively characterize RUL prediction performance. The evaluation indexes can be respectively calculated by:

$$A_i = \begin{cases} \exp(-((\overline{Rul}_i - Rul_i)/13)) - 1, & \overline{Rul}_i < Rul_i \\ \exp((\overline{Rul}_i - Rul_i)/10) - 1, & \overline{Rul}_i \geq Rul_i \end{cases} \quad (21)$$

$$\text{Score} = \sum_{i=1}^{N} A_i \quad (22)$$

$$RMSE = \sqrt{\frac{1}{N}\sum_{i=1}^{N}(Rul_i - \overline{Rul}_i)^2} \quad (23)$$

In Equations (21), (22), and (23), $Rul_i$ and $\overline{Rul}_i$ are respectively an actual RUL and a predicted RUL of an ith engine, and N is a total number of engines in a subset. Values of these indexes are inversely proportional to the RUL performance, namely the smaller the values, the better the performance of the model. The score imposes a greater penalty on over-prediction than the RMSE and thus is more suitable for engineering practices. Therefore, while the RMSEs are close to each other, the model is more evaluated based on the scores.

6-2) RUL prediction and comparison: The proposed ADLDNN is trained first by FD001, FD002, FD003 and FD004 training sets, and tested by corresponding test sets. Predicted results on the four subsets are respectively as shown in FIGS. 4-7.

In FIGS. 4-7, the x axis refers to a number of test engines, and the y axis refers to a RUL value. The predicted RUL and the actual RUL are respectively described by a solid line and a dotted line. The header in FIGS. 4-7 shows the score value and the RMSE value in the predicted result. It can be intuitively seen that the error between the predicted RUL and the actual RUL in FIG. 4 is less than that in FIGS. 5-7, which means that the proposed ADLDNN shows best performance on FD001. In addition, the method shows better performance on FD003 than FD002, and worst performance on FD004.

The engine has a relatively simple degradation trend in a single operating condition, and there is a large overlapping degree between the training set and the test set. Hence, predicted results on FD001 and FD003 in the single operating condition are superior to those on FD002 and FD004 in various operating conditions. In addition, the predicted result on FD001 is more accurate than that on FD003, and the predicted result on FD002 is more accurate than that on the FD004. Therefore, the prediction accuracy in the single-failure mode is higher than that in the multi-failure mode. It can be further seen that the predicted result on FD003 is superior to that on FD002, which means that the number of failure modes has a less impact on RUL prediction than the number of operating conditions.

In order to further show the superiority of the ADLDNN in RUL prediction, comparisons are made between the proposed method and various typical methods based on the statistical model, shallow learning model, classic DL model and several recently published DL models. In addition, scores and RMSEs calculated according to predicted results of the above all methods are as shown in Table 3. As can be seen from the table, all methods show the best predictive effect to FD001 and the worst predictive effect to FD004. This is because FD001 is the simplest subset, while FD004 has the most complex operating conditions and fault types and more test engine numbers than other subsets. All methods are more accurate to FD003 than FD002, which further proves that the operating condition and the engine number have a greater impact on the accuracy of RUL prediction than the fault type.

As can be seen from Table 3, for the simplest FD001, except Acyclic Graph Network, a score and an RMSE in the result predicted by the method are smaller than those in the results predicted by existing other methods. However, for complex datasets such as FD002 and FD004, the method shows a stronger prediction capability than other typical methods. In addition, since the score is more practical than the RMSE in actual engineering, the ADLDNN is considered to be superior to Acyclic Graph Network in FD003. Compared with existing typical methods, the ADLDNN is more applied to process complex datasets including various operating conditions and fault types. In conclusion, the ADLDNN shows high overall performance, and can be better applied to predict the machine RUL.

TABLE 3

Quantitative comparisons of different methods in prediction performance on datasets

| Data set | Evaluation standard | Statistical method Cox's regression | Shallow learning method | | | | | DL method | |
|---|---|---|---|---|---|---|---|---|---|
| | | | MLP | SVR | RVR | ELM | RF | CNN | LSTM |
| FD001 | RMSE | 45.10 | 37.56 | 20.96 | 23.86 | 17.27 | 17.91 | 18.45 | 16.14 |
| | Score | 28616 | 17972 | 1381.5 | 1502.9 | 523 | 479.75 | 1286.7 | 338 |
| FD002 | RMSE | N/A | 80.03 | 41.99 | 31.29 | 37.28 | 29.59 | 30.29 | 24.49 |
| | Score | N/A | 7802800 | 58990 | 17423 | 498149 | 70456 | 17423 | 4450 |
| FD003 | RMSE | N/A | 37.38 | 21.04 | 22.36 | 18.9 | 20.27 | 19.81 | 16.18 |
| | Score | N/A | 17409 | 1598.3 | 1431.6 | 121414 | 711.13 | 1431 | 852 |
| FD004 | RMSE | 54.29 | 77.37 | 45.35 | 34.34 | 38.43 | 31.12 | 29.16 | 28.17 |
| | Score | 1164590 | 5616600 | 371140 | 26509 | 121414.47 | 46567.63 | 7886.4 | 5550 |

| Data set | Evaluation standard | DL method | | | | | | Prediction method of the present disclosure ADLDNN |
|---|---|---|---|---|---|---|---|---|
| | | DBN | MONBNE | LSTM + attention + handscraft feature | Acyclic Graph Network | SUR-LSTM | AEQRNN | |
| FD001 | RMSE | 15.21 | 15.04 | 14.53 | 11.96 | 14.46 | N/A | 13.19 |
| | Score | 417.59 | 334.23 | 322.44 | 229 | 200 | N/A | 275 |
| FD002 | RMSE | 27.12 | 25.05 | N/A | 20.34 | 21.1 | 19.10 | 17.33 |
| | Score | 9031.64 | 5590 | N/A | 2730 | 1383 | 3220 | 1149 |
| FD003 | RMSE | 14.71 | 12.51 | N/A | 12.46 | 17.16 | N/A | 13.81 |
| | Score | 442.43 | 422 | N/A | 535 | 370 | N/A | 334 |
| FD004 | RMSE | 29.88 | 28.66 | 27.08 | 22.43 | 22.61 | 20.6 | 19.89 |
| | Score | 7954.51 | 6557.62 | 5649.14 | 3370 | 2602 | 4597 | 2505 |

Those skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may be in a form of a computer program product that is implemented on one or more computer-usable storage media (including but not limited to a magnetic disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, such that the instructions executed by a computer or a processor of another programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, such that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Finally, it should be noted that: the above embodiments are merely intended to describe the technical solutions of the present disclosure, rather than to limit thereto; although the present disclosure is described in detail with reference to the above embodiments. It is to be appreciated by those of ordinary skill in the art that modifications or equivalent substitutions may still be made to the specific implementations of the present disclosure, and any modifications or equivalent substitutions made without departing from the spirit and scope of the present disclosure shall fall within the protection scope of the claims of the present disclosure.

What is claimed is:

1. A method for predicting a remaining useful life (RUL) of an aero-engine based on an automatic differential learning deep neural network (ADLDNN), specifically comprising the following steps:
   1) Data acquisition: acquiring multidimensional degradation parameters of an aero-engine to be predicted, analyzing a stable trend, and selecting a plurality of parameters capable of reflecting degradation performance of the aero-engine to obtain acquired data;
   2) data preprocessing: segmenting the acquired data by a sliding window (SW) to obtain preprocessed data;
   3) model construction: constructing an RUL prediction model of the aero-engine based on an ADLDNN, the RUL prediction model comprising a multibranch convolutional neural network (MBCNN) model, a multicellular bidirectional long short-term memory (MCBLSTM) model, a fully connected (FC) layer FC1, and a regression layer;
   4) Feature extraction: taking the preprocessed data as input data of the MBCNN model, extracting an output of the MBCNN model, taking the output of the MBCNN model and recursive data as input data of the MCBLSTM model, and extracting an output of the MCBLSTM model;
   5) RUL prediction: taking the output of the MCBLSTM model as an input of the FC layer FC1 to obtain an output of the FC layer FC1, and inputting the output of the FC layer FC1 to the regression layer to predict an RUL; and
   6) performing maintenance of the aero-engine based on the RUL;

wherein the MBCNN model comprises a level division unit, and a spatial feature alienation-extraction unit; and the MCBLSTM model comprises a bidirectional trend-level division unit, and multicellular update units;

wherein the extracting an output of the MBCNN model in step 4) specifically comprises:
   4-1-1) level division: taking the preprocessed data in step 2) as the input data, inputting input data $x_t$ at time t to the level division unit of the MBCNN model for level division, the level division unit comprising an FC layer FC2 composed of five neurons, and performing softmax normalization on an output $D_t$ of the FC layer FC2 to obtain a level division result $D_{1t}$:

$$D_t = \tanh(w_{xd_1} x_t + b_{d_1}) \tag{1}$$

$$D_{1t} = \text{soft max}(D_t) = [d_{11t}, d_{12t}, d_{13t}, d_{14t}, d_{15t}] \tag{2}$$

wherein in equations (1) and (2), $w_{xd_1}$ and $b_{d_1}$ respectively represent a weight and a bias of the FC layer FC2, $d_{11t}$, $d_{12t}$, $d_{13t}$, $d_{14t}$ and $d_{15t}$ respectively represent an important level, a relatively important level, a general level, a relatively minor level and a minor level, and a position of a maximal element in $D_{1t}$ represents a level division result of a present input; and 4-1-2) feature extraction: inputting, according to a level division result $D_1$ of the input data, the input data to different convolution paths of the spatial feature alienation-extraction unit for convolution, and performing automatic differential processing on an input measured value according to the level division result and five designed convolution paths to obtain a health feature $h_t^1$:

$$h_{ti}^1 = P_{15}(C_{15}(P_{14}(C_{14}(P_{13}(C_{13}(P_{12}(C_{12}(P_{11}(C_{11}(x_t)))))))))))$$

$$h_{tj}^1 = P_{24}(C_{24}(P_{23}(C_{23}(P_{22}(C_{22}(P_{21}(C_{21}(x_t)))))))))$$

$$h_{tk}^1 = P_{33}(C_{33}(P_{32}(C_{32}(P_{31}(C_{31}(x_t))))))$$

$$h_{tl}^1 = P_{42}(C_{42}(P_{41}(C_{41}(x_t))))$$

$$h_{tm}^1 = P_{51}(C_{51}(x_t))$$

$$h_t^1 = D_{1t}[h_{ti}^1 h_{tj}^1 h_{tk}^1 h_{tl}^1 h_{tm}^1]^T \tag{3}$$

wherein in equation (3), $P_{ij}$ and $C_{ij}$ respectively represent a jth convolution operation and a jth pooling operation for an ith convolution path, $h_{ti}^1$ is a convolution output of data of the important level, $h_{tj}^1$ is a convolution output of data of the relatively important level, $h_{tk}^1$ is a convolution output of data of the general level, $h_{tl}^1$ is a convolution output of data of the relatively minor level, and $h_{tm}^1$ is a convolution output of data of the minor level.

2. The method for predicting the RUL of an aero-engine based on the ADLDNN according to claim 1, wherein the extracting an output of the MCBLSTM model in step 4) specifically comprises:
   4-2-1) trend division: taking an output $h_t^1$ of the MBCNN model at time t and recursive data $h_{t-1}^2$ of the MCBLSTM model at time t−1 as input data of the MCBLSTM at time t, and inputting the input data to the bidirectional trend-level division unit for trend division, the bidirectional trend-level division unit comprising an FC layer FC3 and an FC layer FC4 for dividing a trend level of the input data along forward and backward directions, the FC layer FC3 and the FC layer FC4 each comprising five neurons, and the FC layer FC3 and the FC layer FC4 respectively having an output $\vec{D}_{2t}$ and an output $\overleftarrow{D}_{2t}$:

$$\vec{D}_{2t} = \tanh\left(\vec{h}_t^1 \vec{w}_{xd_2} + \vec{h}_{t-1}^2 \vec{w}_{hd_2} + \vec{b}_{d_2}\right) \quad (4)$$

$$\overleftarrow{D}_{2t} = \tanh\left(\overleftarrow{h}_t^1 \overleftarrow{w}_{xd_2} + \overleftarrow{h}_{t-1}^2 \overleftarrow{w}_{hd_2} + \overleftarrow{b}_{d_2}\right)$$

wherein in equation (4), $\vec{w}_{xd_2}$ and $\vec{w}_{hd_2}$ each are a weight of the FC layer FC3, $\overleftarrow{w}_{xd_2}$ and $\overleftarrow{w}_{hd_2}$ each are a weight of the FC layer FC4, $\vec{b}_{d_2}$ is a bias of the FC layer FC3, and $\overleftarrow{b}_{xd_2}$ is a bias of the FC layer FC4; and respectively performing a softmax operation on the $\vec{D}_{2t}$ and the $\overleftarrow{D}_{2t}$ to obtain forward and backward trend levels $\vec{D}_{2t}$ and $\overleftarrow{c}_{/2t}$:

$$\vec{D}_{2t} = \text{soft max}(\vec{D}_{2t}) = [\vec{d}_{21t} \vec{d}_{22t} \vec{d}_{23t} \vec{d}_{24t} \vec{d}_{25t}]$$

$$\overleftarrow{c}_{/2t} = \text{soft max}(\overleftarrow{D}_{2t}) = [\overleftarrow{d}_{21t} \overleftarrow{d}_{22t} \overleftarrow{d}_{23t} \overleftarrow{d}_{24t} \overleftarrow{d}_{25t}] \quad (5)$$

in equation (5), $\vec{d}_{21t}$ ($\overleftarrow{d}_{21t}$), $\vec{d}_{22t}$ ($\overleftarrow{d}_{22t}$), $\vec{d}_{23t}$ ($\overleftarrow{d}_{23t}$), $\vec{d}_{24t}$ ($\overleftarrow{d}_{24t}$), and $\vec{d}_{25t}$ ($\overleftarrow{d}_{25t}$) respectively represent a local trend, a medium and short-term trend, a medium-term trend, a medium and long-term trend and a global trend in bidirectional calculation, and $\vec{d}_{2\,max\,t}$ and $\overleftarrow{d}_{2\,max\,t}$ in $\vec{D}_{2t}$ and $\overleftarrow{c}_{/2t}$ represent trend levels along two directions at the time t; and 4-2-2) feature extraction: inputting, according to the trend division results $\vec{D}_{2t}$ and $\overleftarrow{c}_{/2t}$, data of different trends to the multicellular update units $\vec{c}_{/t}$ and $\overleftarrow{c}_{/t}$, which perform differential learning along the two directions, for update, the $\vec{c}_{/t}$ comprising five subunits $\vec{c}_{/t}(i)$, $\vec{c}_{/t}(j)$, $\vec{c}_{/t}(k)$, $\vec{c}_{/t}(l)$, and $\vec{c}_{/t}(m)$, and the $\overleftarrow{c}_{/t}$ comprising five subunits $\overleftarrow{c}_{/t}(i)$, $\overleftarrow{c}_{/t}(j)$, $\overleftarrow{c}_{/t}(k)$, $\overleftarrow{c}_{/t}(l)$, and $\overleftarrow{c}_{/t}(m)$:

$$\overset{r}{i}_t = \sigma\left(\overset{r}{w}_{ih1}\overset{r1}{h}_t + \overset{r}{w}_{ih2}\overset{r2}{h}_{t-1}\overset{r}{b}_i\right) \quad (6)$$

$$\overset{r}{f}_t = \sigma\left(\overset{r}{w}_{fh1}\overset{r1}{h}_t + \overset{r}{w}_{fh2}\overset{r2}{h}_{t-1}\overset{r}{b}_f\right)$$

$$\overset{s}{i}_t = \sigma\left(\overset{s}{w}_{ih1}\overset{s1}{h}_t + \overset{s}{w}_{ih2}\overset{s2}{h}_{t-1}\overset{s}{b}_i\right)$$

$$\overset{s}{f}_t = \sigma\left(\overset{s}{w}_{fh1}\overset{s1}{h}_t + \overset{s}{w}_{fh2}\overset{s2}{h}_{t-1}\overset{s}{b}_f\right)$$

$$\overset{r}{c}_t(m) = \overset{r}{c}_{t-1}$$

$$\overset{s}{c}_t(m) = \overset{s}{c}_{t-1}$$

$$\overset{r}{c}_t(i) = \frac{r}{c_t} = \tanh\left(\overset{r}{W}_{ch1}\overset{r1}{h}_t + \overset{r}{W}_{ch2}\overset{r2}{h}_{t-1} + \overset{r}{b}_c\right)$$

-continued $$\overset{s}{c}_t(i) = \frac{s}{c_t} = \tanh\left(\overset{s}{W}_{ch1}\overset{s1}{h}_t + \overset{s}{W}_{ch2}\overset{s2}{h}_{t-1} + \overset{s}{b}_c\right)$$

$$\overset{r}{c}_t(k) = \overset{r}{f}_t e \overset{r}{c}_{t-1} + \overset{r}{i}_t e \frac{r}{c_t}$$

$$\overset{s}{c}_t(k) = \overset{s}{f}_t e \overset{s}{c}_{t-1} + \overset{s}{i}_t e \frac{s}{c_t}$$

$$\overset{r}{c}_t(l) = s_1\left(\overset{r}{f}_t e \overset{r}{c}_{t-1} + \overset{r}{i}_t e \frac{r}{c_t}\right) + (1-s_1)\overset{r}{c}_{t-1}$$

$$\overset{s}{c}_t(l) = s_3\left(\overset{s}{f}_t e \overset{s}{c}_{t-1} + \overset{s}{i}_t e \frac{s}{c_t}\right) + (1-s_3)\overset{s}{c}_{t-1}$$

$$\overset{r}{c}_t(j) = s_2\left(\overset{r}{f}_t e \overset{r}{c}_{t-1} + \overset{r}{i}_t e \frac{r}{c_t}\right) + (1-s_2)\frac{r}{c_t}$$

$$\overset{s}{c}_t(j) = s_4\left(\overset{s}{f}_t e \overset{s}{c}_{t-1} + \overset{s}{i}_t e \frac{s}{c_t}\right) + (1-s_5)\frac{s}{c_t}$$

wherein in equation (6), arrows → and ← respectively represent forward and backward processes, $\vec{c}_{/t}(m)$, $\overleftarrow{c}_{/t}(m)$ are corresponding data update units of the global trend in the bidirectional calculation, $\vec{c}_{/t}(i)$, $\overleftarrow{c}_{/t}(i)$ are corresponding data update units of the short-term trend in the bidirectional calculation, $\vec{c}_{/t}(k)$, $\overleftarrow{c}_{/t}(k)$ are corresponding data update units of the medium-term trend in the bidirectional calculation, $\vec{c}_{/t}(l)$, $\overleftarrow{c}_{/t}(l)$ are corresponding data update units of the medium and long-term trend in the bidirectional calculation, $\vec{c}_{/t}(j)$, $\overleftarrow{c}_{/t}(j)$ are corresponding data update units of the medium and short-term trend in the bidirectional calculation, σ is a sigmod activation function, $\overset{r}{W}_{ih1}, \overset{s}{W}_{ih1}$ and $\overset{r}{W}_{ih2}, \overset{s}{W}_{ih2}$ are weights of input gates of the MCBLSTM model, $\overset{r}{w}_{ih1}, \overset{s}{w}_{ih1}$ and $\overset{r}{w}_{ih2}, \overset{s}{w}_{ih2}$ are weights of forget gates of the MCBLSTM model, $\overset{r}{w}_{ch1}, \overset{s}{w}_{ch1}$ and $\overset{r}{w}_{ch2}, \overset{s}{w}_{ch2}$ are weights of cell storage units of the MCBLSTM model, $\overset{r}{b}_i$ and $\overset{s}{b}_i$ are biases of the input gates of the MCBLSTM model, $\overset{r}{b}_f$ and $\overset{s}{b}_f$ are biases of the forget gates of the MCBLSTM model, $\overset{r}{b}_c$ and $\overset{s}{b}_c$ are biases of the cell storage units of the MCBLSTM model, ⊙ is a dot product operation, and $s_1$, $s_2$, $s_3$, and $s_4$ each are a mix proportion factor obtained by learning; and combining weights of alienation outputs of daughter-cell units in the multicellular update units according to update results of five alienation units and the trend division results $\vec{D}_{2t}$ and $\bar{c}_{2t}$ to obtain outputs $\vec{c}_{i,t}$ and $\bar{c}_{i,t}$ of the multicellular update units, and controlling output gates $\vec{o}_t$ and $\bar{o}_t$ of the MCBLSTM model to obtain an output $h^2_t$ of the MCBLSTM model at the time t:

$\vec{c}_t = \vec{D}_{2t}[\vec{c}_t(i)\ \vec{c}_t(j)\ \vec{c}_t(k)\ \vec{c}_t(l)\ \vec{c}_t(m)]^T$ $\bar{c}_t = \bar{D}_{2t}[\bar{c}_t(i)\ \bar{c}_t(j)\ \bar{c}_t(k)\ \bar{c}_t(l)\ \bar{c}_t(m)]^T$ $\vec{o}_t = \sigma(\vec{w}_{ox}\vec{h}_t^1 + \vec{w}_{oh}\vec{h}_{t-1}^2 + \vec{b}_o)$ $\bar{o}_t = \sigma(\bar{w}_{ox}\bar{h}_t^1 + \bar{w}_{oh}\bar{h}_{t-1}^2 + \bar{b}_o)$ $\vec{h}_t^2 = \vec{o}_t \square \tanh(\vec{c}_t)$ $\bar{h}_t^2 = \bar{o}_t \square \tanh(\bar{c}_t)$ $h_t^2 = \vec{h}_t^2 \oplus \bar{h}_t^2$ \hfill (7)

wherein in equation (7), $\vec{w}_{ox}$, $\vec{w}_{ohoh}$ and $\bar{w}_{ox}$, $\bar{w}_{ohoh}$ are weights of the output gates of the MCBLSTM model, and $\sigma$ and tanh each are an activation function.

3. The method for predicting the RUL of an aero-engine based on the ADLDNN according to claim 1, wherein the predicting the RUL in step 5) specifically comprises:

inputting $h^2_t$ to the FC layer FC1, preventing overfitting by Dropout to obtain an output $h^3_t$ of the FC layer FC1, and inputting the $h^3_t$ to the regression layer to obtain a predicted $RUL^y_t$:

$$h_t^3 = \text{dropout}\left(Relu\left(w_{h_2 h_3} h_t^2 + b_{h_3}\right)\right) \tag{8}$$

$$y_t = \text{Linear}\left(w_{h_3 y} h_t^3 + b_y\right) \tag{9}$$

wherein in equations (8) and (9), $w_{h_2 h_3}$ is a weight of the FC layer FC1, $b_{h_3}$ is a bias of the FC layer FC1, $w_{h_3 y}$ is a weight of the regression layer, and $b_y$ is a bias of the regression layer.

* * * * *